US010650017B1

United States Patent
Gupta et al.

(10) Patent No.: US 10,650,017 B1
(45) Date of Patent: May 12, 2020

(54) TIERED STORAGE FOR DATA PROCESSING

(71) Applicant: Amazon Technologies, Inc., Seattle, WA (US)

(72) Inventors: Anurag Windlass Gupta, Atherton, CA (US); Andrew Edward Caldwell, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 15/250,641

(22) Filed: Aug. 29, 2016

(51) Int. Cl.
*G06F 17/00* (2019.01)
*G06F 16/25* (2019.01)
*G06F 16/28* (2019.01)
*G06F 16/22* (2019.01)

(52) U.S. Cl.
CPC ........ *G06F 16/254* (2019.01); *G06F 16/2282* (2019.01); *G06F 16/283* (2019.01)

(58) Field of Classification Search
CPC ......... G06F 17/30563; G06F 17/30339; G06F 17/30592; G06F 17/30286; G06F 17/30067; G06F 17/30079; G06F 12/02; G06F 12/0253; G06F 12/0276; G06F 17/30; G06F 17/30091; G06F 17/30094; G06F 17/30448; G06F 17/30595; G06F 17/30958; G06F 17/30156; G06F 17/30159; G06F 3/0641; G06F 16/254; G06F 16/2282; G06F 16/283; G06Q 50/01; H03M 7/30; H03M 7/3064
USPC ....... 707/688, 692, 693, 694, 812, 813, 816, 707/817, 819
See application file for complete search history.

(56) References Cited

U.S. PATENT DOCUMENTS

| | | | |
|---|---|---|---|
| 5,832,515 A * | 11/1998 | Ledain | G06F 3/0619 |
| 6,363,388 B1 | 3/2002 | Sprenger et al. | |
| 7,499,909 B2 | 3/2009 | Liu et al. | |
| 8,074,028 B2 | 12/2011 | Plamondon | |
| 8,650,164 B2 * | 2/2014 | Rothschild | G06F 17/3028 707/693 |
| 8,935,302 B2 * | 1/2015 | Flynn | G06F 3/0616 707/610 |
| 8,959,108 B2 | 2/2015 | Pereira et al. | |
| 9,460,025 B1 * | 10/2016 | Wallace | G06F 12/0871 |
| 2010/0082547 A1 * | 4/2010 | Mace | G06F 11/1435 707/648 |
| 2011/0258225 A1 | 10/2011 | Taylor et al. | |

(Continued)

*Primary Examiner* — Greta L Robinson
(74) *Attorney, Agent, or Firm* — Robert C. Kowert; Kowert, Hood, Munyon, Rankin & Goetzel, P.C.

(57) ABSTRACT

Tiered storage may be implemented for processing data. Data processors may maintain some of a data set, including user data and metadata describing the user data, locally. The data set is also maintained a data store remote to the data processor. When processing requests are received, a determination is made as to whether the local portions of the data set can execute the processing request or one or more additional portions of the data set are needed from the remote data store. If additional portions of the data set are needed, then a request may be sent to the data store for the additional portions. Once received, the data processor may execute the processing request utilizing the additional portions. Portions of the data set maintained locally at the data processor may be selected and flushed from local storage to the remote data store.

20 Claims, 10 Drawing Sheets

(56) References Cited

U.S. PATENT DOCUMENTS

| | | | |
|---|---|---|---|
| 2012/0047188 A9* | 2/2012 | Chron | G06F 17/30117 |
| | | | 707/813 |
| 2013/0151804 A1* | 6/2013 | Alatorre | G06F 12/02 |
| | | | 711/170 |
| 2015/0032684 A1* | 1/2015 | Gupta | G06F 16/22 |
| | | | 707/600 |
| 2016/0147797 A1* | 5/2016 | Dolph | G06F 17/30303 |
| | | | 707/692 |
| 2016/0292186 A1* | 10/2016 | Black | G06F 16/212 |
| 2016/0342654 A1* | 11/2016 | Bendel | G06F 17/30463 |
| 2018/0150548 A1* | 5/2018 | Shah | G06F 16/254 |

* cited by examiner

TIERED STORAGE FOR DATA PROCESSING

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing often relies upon locality to improve processing performance. Related data, or other data likely to be accessed together, are often co-located so that when the data is accessed for processing, a smaller number input/output (I/O) operations are performed. Because there are multiple ways data can be related to one another, it can be difficult to select a storage scheme that places data together for an optimal number of processing patterns that can be improved by locality. Moreover, as the size of data sets being processed increases, it can become challenging to procure enough storage space to locate data together as desired. Therefore, techniques that improve the ability to locate data together may result in improvements to the performance of data processing.

Figure 1:
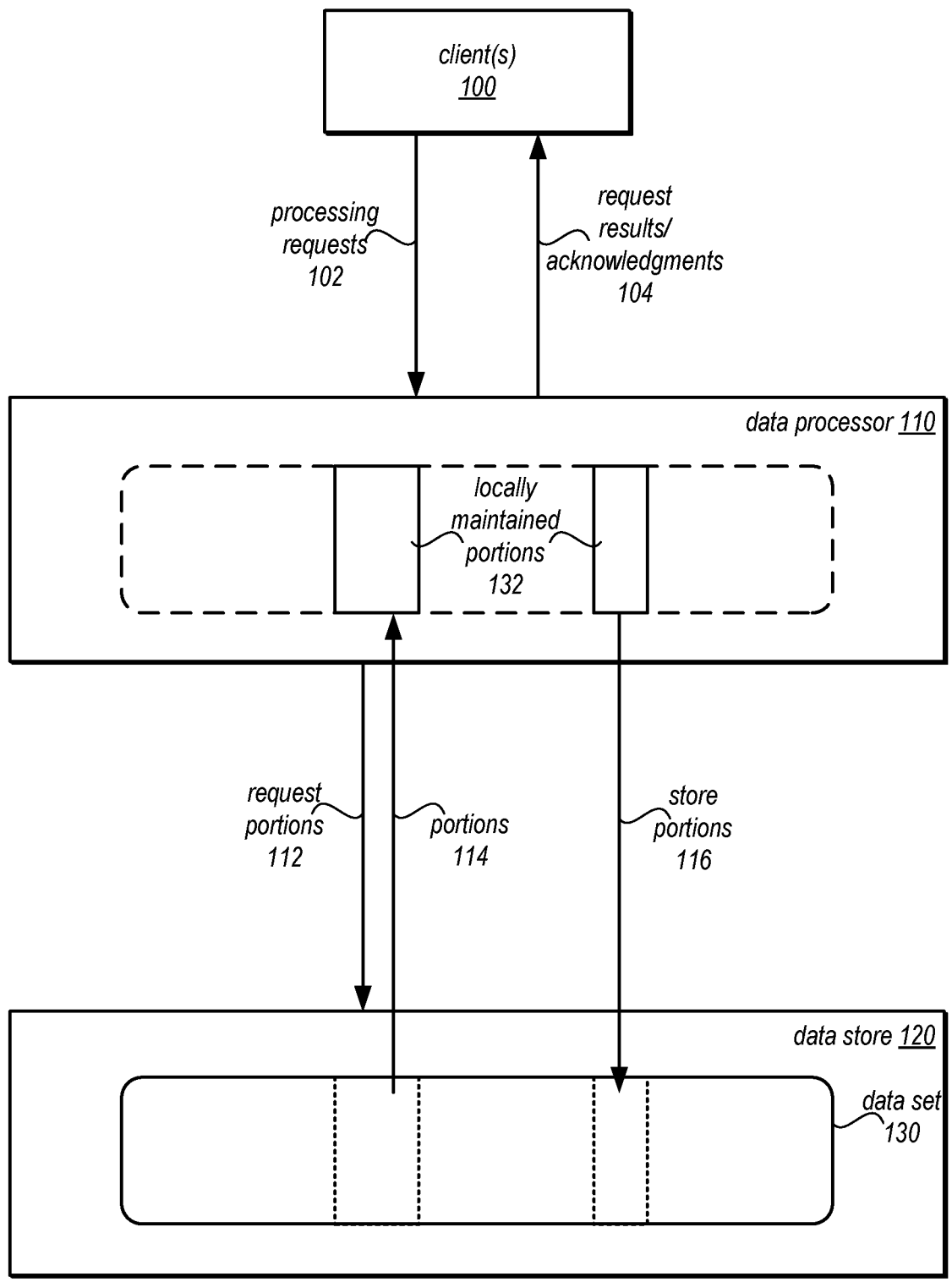
FIG. 1 illustrates a logical block diagram of tiered storage for data processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of tiered storage for data processing are described herein. Often data processing is tightly coupled with data storage in order to ensure that the time to access data in order to perform processing requests is minimized. However, some data sets are very large, requiring a large amount of storage capacity just to maintain the data set. In order to ensure that processing is tightly coupled, a correspondingly large number of processing components may then be created to access and execute upon the storage capacity. For instance, a common data storage technique creates a cluster of nodes, systems or devices that provide both storage and processing capacity. The cluster may work in parallel to divide the workload of data processing amongst the nodes. In such a scheme, the greater the size of the data set, the greater the size of the cluster. For large data sets, the cluster size can become large, resulting in scenarios where only a portion of the processing components are utilized if only a portion of the data is processed (with remaining processing components underutilized, increasing the cost to maintain the data set). Moreover, locating data that is commonly accessed together can be challenging as the data may be divided amongst a large number of nodes.

Implementing tiered storage for data processing, reduces the amount of storage capacity that is tightly coupled to data processing resources by only storing a portion of a data set locally at a data processor (e.g., storing only portions of a data set at nodes in a cluster). Less frequently accessed data may be stored remotely and retrieved when needed (e.g., upon demand). Additionally, frequently accessed data can be located together at a data processor (e.g., at a same node in a cluster) to reduce I/O operations when processing the data because the demands upon storage capacity at the data processor may be reduced (as less frequently accessed data does not also have to be accommodated). Tiered storage may also allow for the portions of data maintained locally at a data processor to change over time, adapting to changes in access or utilization.

FIG. 1 illustrates a logical block diagram of tiered storage for data processing, according to some embodiments. Various client(s) 100 may implement data processor 110 for executing various processing requests 102 upon a data set 130. For instance, data set 130 may be a database table or structured data object that is searched, analyzed, updated, or otherwise read from in order to obtain various results 104. Processing requests 102 may, for example, by a query formatted according to structured query language (SQL), which may specify various query predicates, conditions, or other operations to return or update a subset of data satisfying the query predicates, or processing requests may be requests that trigger the execution of previously defined processing jobs (e.g., batch process data stored as part of a previous night's upload). Generally, processing requests may result in reading, writing, obtaining, modifying, or otherwise accessing portions of a data set.

Data processor 110 may utilize tiered storage for data set 130. A remote data store, data store 120, with respect to data processor 110 may maintain the entirety of data set 130. For example, data store 120 may maintain the entire database table or structured data object upon which processing requests 102 are executed. Data processor 110 may implement some local storage resources (e.g., attached block-based storage devices) to locally and persistently maintain portions 132 of data set 130. When a processing request is received, a determination may be made as to whether the locally maintained portion(s) 132 are sufficient to execute the processing request. If not then, as discussed below with regard to FIG. 8, a request for portion(s) 112 may be made to data store 120, which may return portion(s) 114. Data processor 110 may then maintain the requested portions 114 as part of locally maintained portions 132 for executing the processing request. In this way, portions of the data set that are frequently accessed together may be retrieved and maintained locally at data processor 110 without any client specification or indication as to how portions of data set 130 may be optimally stored. Instead, portions of the data set frequently accessed may be automatically obtained and maintained locally data processor 110, improving the execution of processing requests.

In order to prevent the local storage of data processor 110 from being filled, techniques to flush or evict some of locally maintained portions 132 from data processor 110 and store or update the corresponding portions 116 in data set 130 at data store 120 may be implemented. For example, FIG. 9, discussed in detail below, tracks access statistics for the different portions of the data, weights them according to a decay function, and then selects portions to flush based on the weighted statistics. Note that various other techniques may be implemented, such as the least recently used portion of the data set, a first in first out portion selection, random selection, application of various statistical analysis (e.g., machine learning) to predictively flush pages that are etc.

Please note that the previous description of tiered storage for data processing is a logical illustration and thus is not to be construed as limiting as to the implementation of a data processor, a data store, a data set (or portions thereof). For example, data processor 110 may be implemented as a cluster or group of nodes that perform data processing.

This specification begins with a general description of a provider network that implements data processing and/or storage services that utilized tiered storage to perform data processing. Then various examples of a data processor, such as a data warehouse service, including different components/modules, or arrangements of components/module that may be employed as part of implementing the data processor are discussed. A number of different methods and techniques to implement tiered storage for data processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
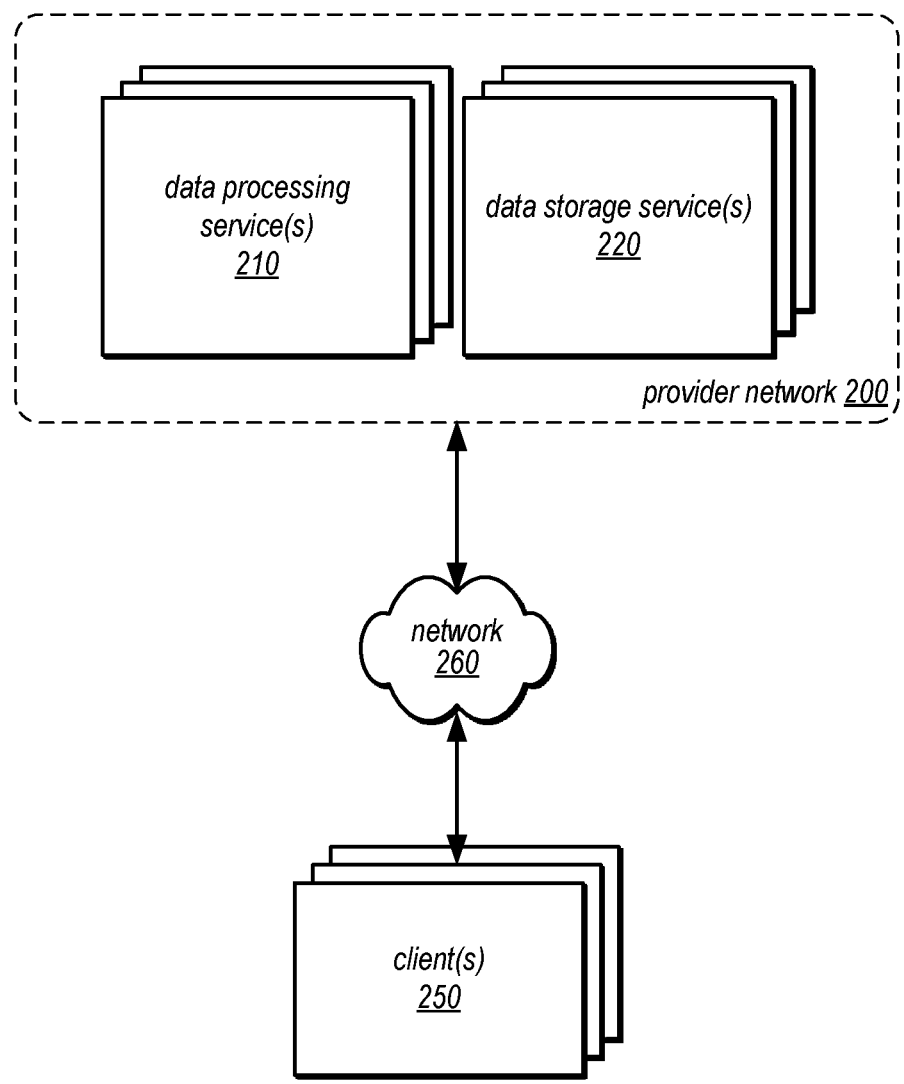
FIG. 2 is a block diagram illustrating a provider network offering data processing services that utilize other data storage services for tiered storage, according to some embodiments.

FIG. 2 is a block diagram illustrating a provider network offering data processing services that utilize other data storage services for tiered storage, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a virtual compute service, data processing service(s) 210, (e.g., map reduce and other large scale data processing services or database services), and data storage services 230 (e.g., object storage services or block-based storage services), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data processing service 210 or data storage service 220) may be implemented by a particular node or may be distributed across several nodes. In some embodiments, a given node may implement the functionality of more than one service system component (e.g., more than one data store component).

Data processing services 210 may be various types of data processing services to perform different functions (e.g., anomaly detection, machine learning, data mining, querying, or any other type of data processing operation). For example, in at least some embodiments, data processing services 210 may include a map reduce service that creates clusters of processing nodes that implement map reduce functionality over data stored in one of data storage services 210. In another example, data processing service(s) 210 may include various types of database storage services (both relational and non-relational) for storing, querying, and updating data. Such services may be enterprise-class database systems that are highly scalable and extensible. Queries may be directed to a database in data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing services may implement, in some embodiments, a data warehouse service, such as discussed below with regard to FIGS. 3-7, that utilizes another data storage service 220 (or a data store external to provider network 200) to implement tiered storage for data processing.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. Such data storage service(s) 230 may be accessed via programmatic interfaces (e.g., APIs) or graphical user interfaces. Data storage service(s) 230 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (i SCSI).

Generally speaking, clients 250 may encompass any type of client configurable to submit network-based requests to provider network 200 via network 260, including requests for storage services (e.g., a request to create, read, write, obtain, or modify data in data storage service(s) 230, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., access requests to read or write data may be directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
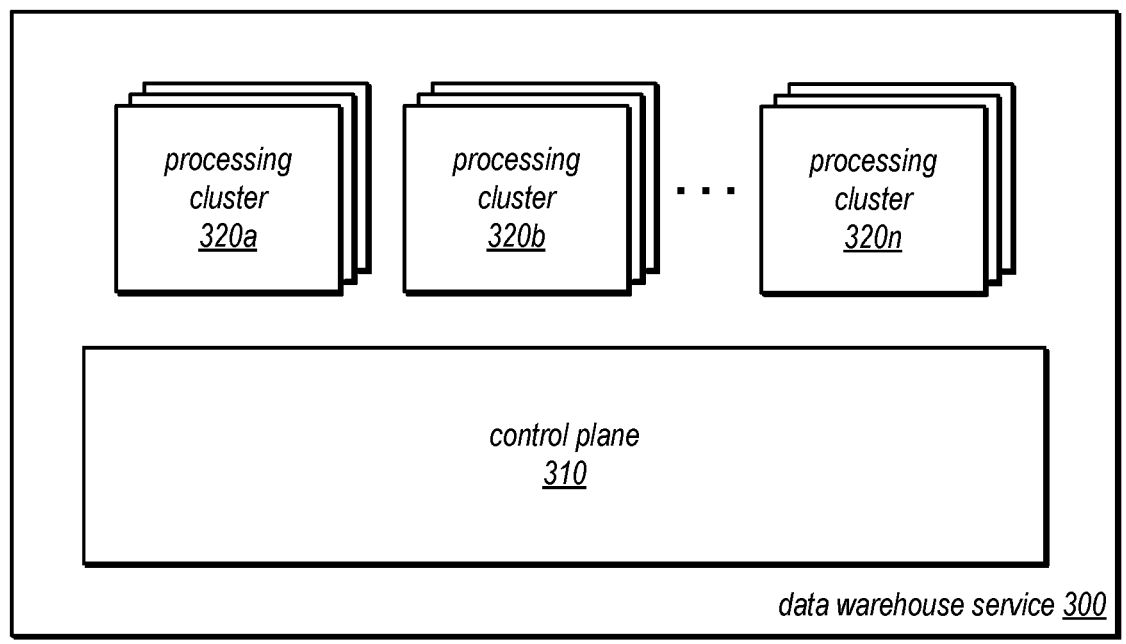
FIG. 3 is a block diagram of a data warehouse service that processes data utilizing another data storage service for tiered storage, according to some embodiments.

In at least some embodiments, one of data processing service(s) 220 may be a data warehouse service. FIG. 3 is a block diagram of a data warehouse service that processes data utilizing another data storage service for tiered storage. A data warehouse service as discussed below may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to storing data in a tree-based data format may be equally configured or adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory (e.g., only retrieving data blocks of those columns from a remote data store according to techniques described below with regard to FIGS. 5-7). To increase the efficiency of implementing a columnar relational database table, a sort order may be generated and applied so that entries in the database table are stored according to the sort order. When queries are received, mapping information, such as may be maintained in a superblock as or other collection of metadata for processing queries may be utilized to locate the data values likely stored in data blocks of the columnar relational database table, which may be used to determine data blocks that do not need to be read when responding to a query.

Data warehouse service 300 may be implemented by a large collection of computing devices, such as customized or off-the-shelf computing systems, servers, or any other combination of computing systems or devices, such as the various types of systems 1000 described below with regard to FIG. 10. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300.

As discussed above, various clients (or customers, organizations, entities, or users) may wish to store and manage data using a data management service. Processing clusters, such as those discussed below with regard to FIG. 4 may respond to various processing requests, including store requests (e.g., to write data into storage) or queries for data (e.g., such as a Server Query Language request (SQL) for particular data), along with many other data management or storage services. Multiple users or clients may access a processing cluster to obtain data warehouse services. In at least some embodiments, a data warehouse service may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320*a*, 320*b*, through 320*n*, hosted by the data warehouse service 300 may provide an enterprise-class database query and management system that allows users to send data processing requests to be executed by the clusters 320, such as by sending a data processing request to a cluster control interface implemented by the network-based service. Scaling clusters 320 may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Figure 4:
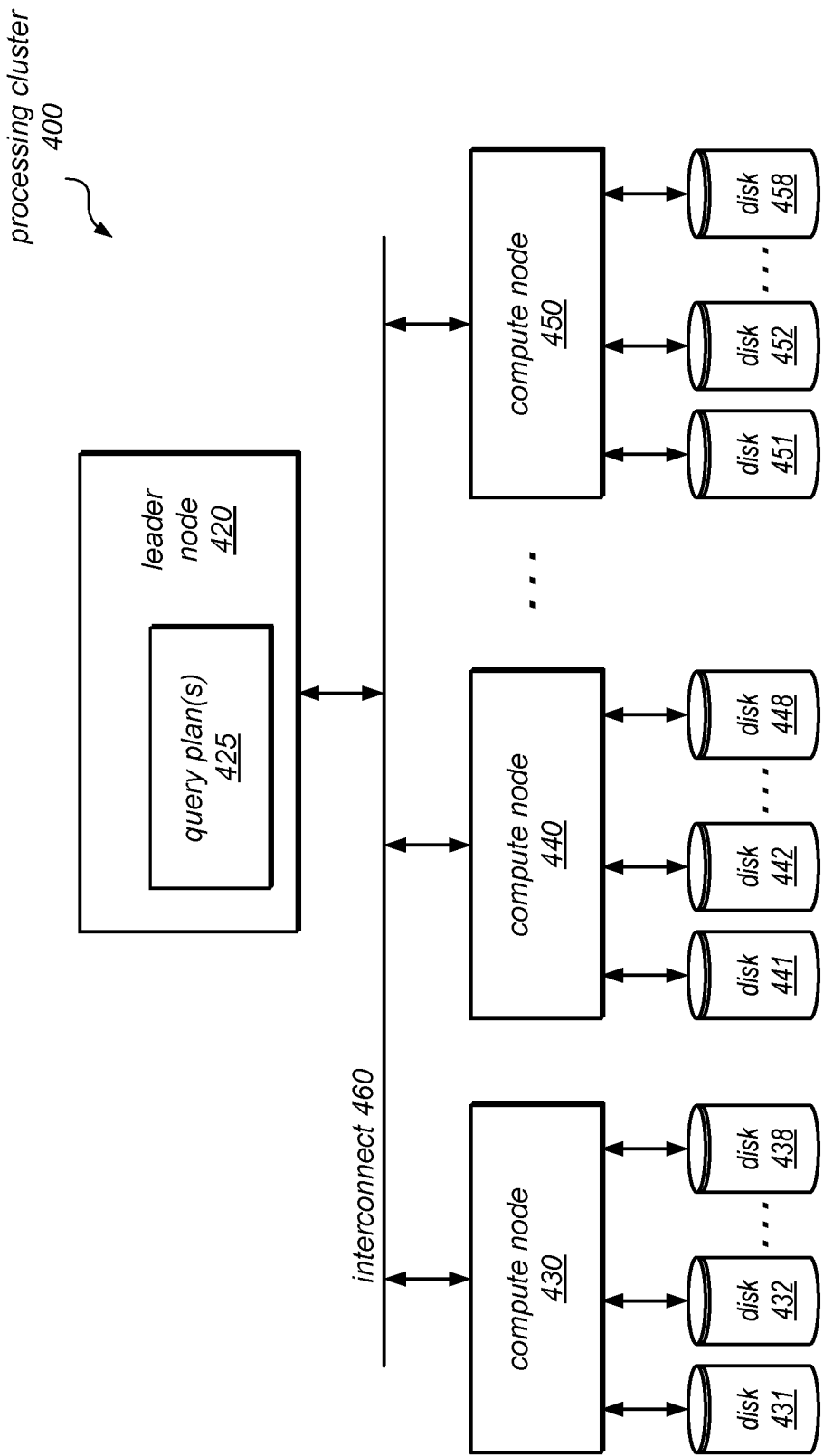
FIG. 4 is a block diagram illustrating an example processing cluster for a data warehouse service, according to some embodiments.

FIG. 4 is a block diagram illustrating an example processing cluster for a data warehouse service, according to some embodiments. As illustrated in this example, a processing cluster 400 may include a leader node 420 and compute nodes 430, 440, and 450, which may communicate with each other over an interconnect 460. Leader node 420 may generate query plan(s) 425 for executing queries on processing cluster 400. As described herein, each node in a processing cluster may include multiple disks on which storage slabs of a table may be stored on behalf of clients (e.g., users, client applications, and/or storage service subscribers). In this example, compute node 430 includes disks 431-438, compute node 440 includes disks 441-448, and compute node 450 includes disks 451-458. In some embodiments, a component of the processing cluster (or the data warehouse system of which it is a component) may support load balancing, using any of a variety of applicable load balancing techniques. For example, in some embodiments, leader node 420 may include a load balancing component (not shown).

Note that in at least some embodiments, query processing capability may be separated from compute nodes, and thus in some embodiments, additional components may be implemented for processing queries. Additionally, it may be that in some embodiments, no one node in processing cluster 400 is a leader node as illustrated in FIG. 4, but rather different nodes of the nodes in processing cluster 400 may act as a leader node or otherwise direct processing of queries to data stored in processing cluster 400. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 400 may be implemented as part of a data warehouse service, as discussed above with regard to FIG. 3, or another data storage service(s) 220, and includes a leader node 420 and multiple compute nodes, such as compute nodes 430, 440, and 450. The leader node 420 may manage communications with clients, such as clients 250 discussed above with regard to FIG. 2. For example, leader node 420 may be a server that receives requests from various client programs (e.g., applications) and/or subscribers (users), then parses them and develops an execution plan (e.g., query plan(s)) to carry out the associated database operation(s)). More specifically, leader node 420 may develop the series of steps necessary to obtain results for complex queries and joins. Leader node 420 may also manage the communications among compute nodes 430 through 450 instructed to carry out database operations for data stored in the processing cluster 400. For example, compiled code may be distributed by leader node 420 to various ones of the compute nodes 430 to 450 to carry out the steps needed to perform queries, and intermediate results of those queries may be sent back to the leader node 420. Leader node 420 may receive data and query responses or results from compute nodes 430, 440, and 450. A database schema and/or other metadata information for the data stored among the compute nodes, such as the data tables stored in the cluster, may be managed and stored by leader node 420.

Processing cluster 400 may also include compute nodes, such as compute nodes 430, 440, and 450. These one or more compute nodes (sometimes referred to as compute nodes), may for example, be implemented on servers or other computing devices, such as those described below with regard to computer system 1000 in FIG. 10, and each may include individual query processing "slices" defined, for example, for each core of a server's multi-core processor. Compute nodes may perform processing of database operations, such as queries, based on instructions sent to compute nodes 430, 440, and 450 from leader node 420. The instructions may, for example, be compiled code from execution plan segments and steps that are executable by the particular compute node to which it is sent. Compute nodes may send intermediate results from queries back to leader node 420 for final aggregation. Each compute node may be configured to access a certain memory and disk space in order to process a portion of the workload for a query (or other database operation) that is sent to one or more of the compute nodes 430, 440 or 450. Thus, compute node 430, for example, may access disk 431, 432, up until disk 438.

Disks, such as the disks 431 through 458 illustrated in FIG. 4, may be may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a processing cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the portions of data (e.g., data blocks) stored on that node (i.e., one entry per data block). In some embodiments, each entry of the superblock data structure includes a unique ID for a respective portion of data (e.g., block), and that unique ID may be used to perform various operations associated with the portion of data. In at least some embodiments, an entry in the superblock may be maintained that indicates the range, such as the min and max values, for sort order values associated with the items stored in the portion of data and described in the superblock.

Figure 5:
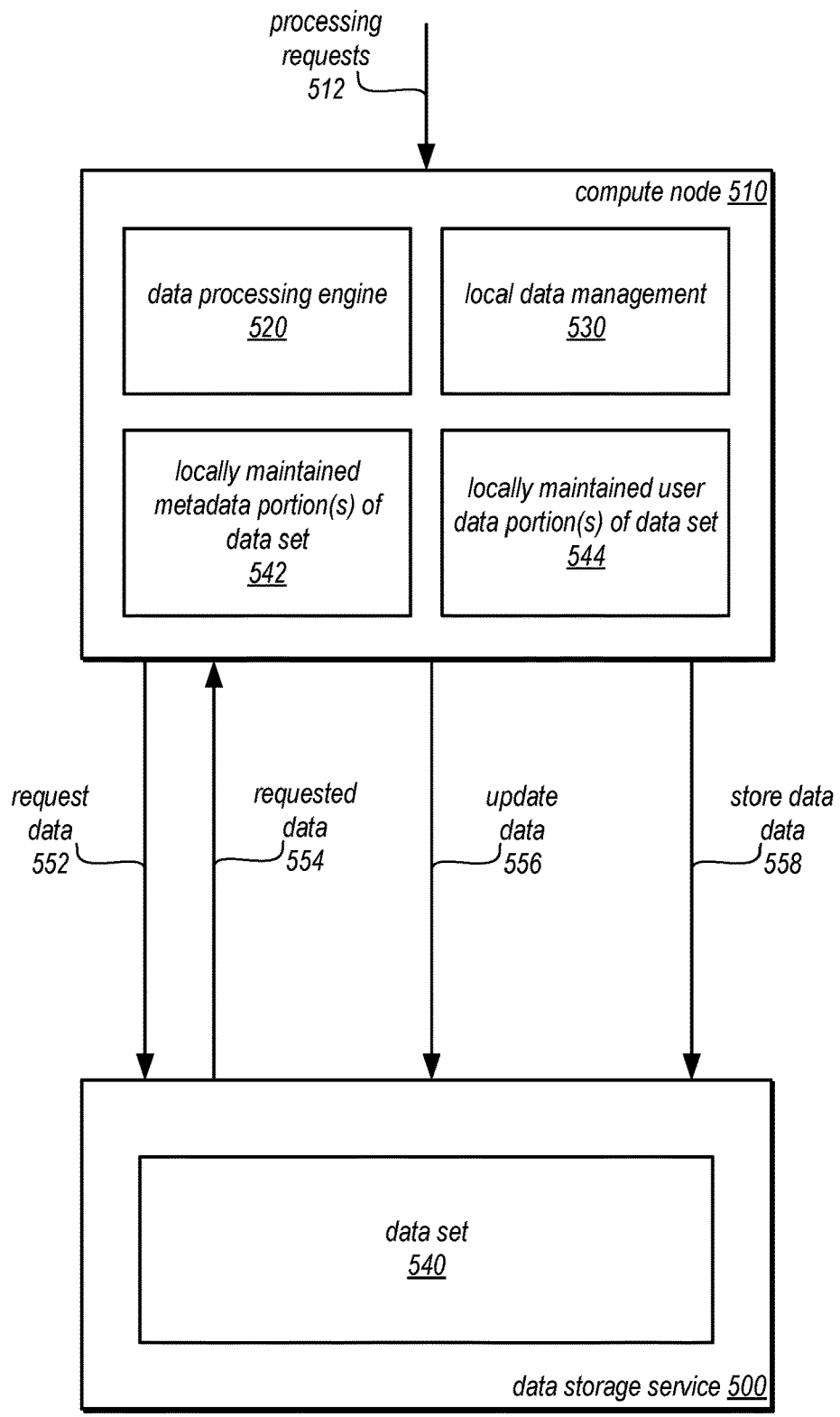
FIG. 5 is a block diagram illustrating an example compute node that executes processing requests for data in tiered storage, according to some embodiments.

FIG. 5 is a block diagram illustrating an example compute node that executes processing requests for data in tiered storage, according to some embodiments. As discussed above, a compute node may be configured to receive processing requests 512, such as queries, storage operations, and other data management operations. Processing requests 512 may be received as inputs to compute node 510. Compute node 510 may communicate with local storage devices to access locally maintained metadata portion(s) of a data set 542 and locally maintained user data portion(s) 544, which may store a plurality of data blocks for multiple columns of a columnar database table, in order to execute processing requests.

Compute node 510 may also communicate with data storage service 500 (which may be a remote data store implemented at another storage service in the provider network or a different data storage system or service external to the provider network). If, for instance, additional data (either metadata or user data) is not present in local storage, then compute node 510 may request specific portions of data 552 from data set 540 maintained at data storage service 500. For example, compute node 510 may be configured to format a request to generate an API call or ISCSI request to retrieve a particular data block, page, chunk or object (or group thereof). Data storage service 500 may return the requested data 554 to compute node to be stored as part of locally maintained metadata 542 and locally maintained user data 544 (e.g., which may be maintained at local block-based storage, such as disks 431-458 in FIG. 4). In some embodiments, compute node 510 may be configured to send requests to update portions of data 556 in data set 540 as part of a flush operation, as discussed below. Compute node 510 may be also configured to store new or additional data 558 in data set 540.

Figure 6:
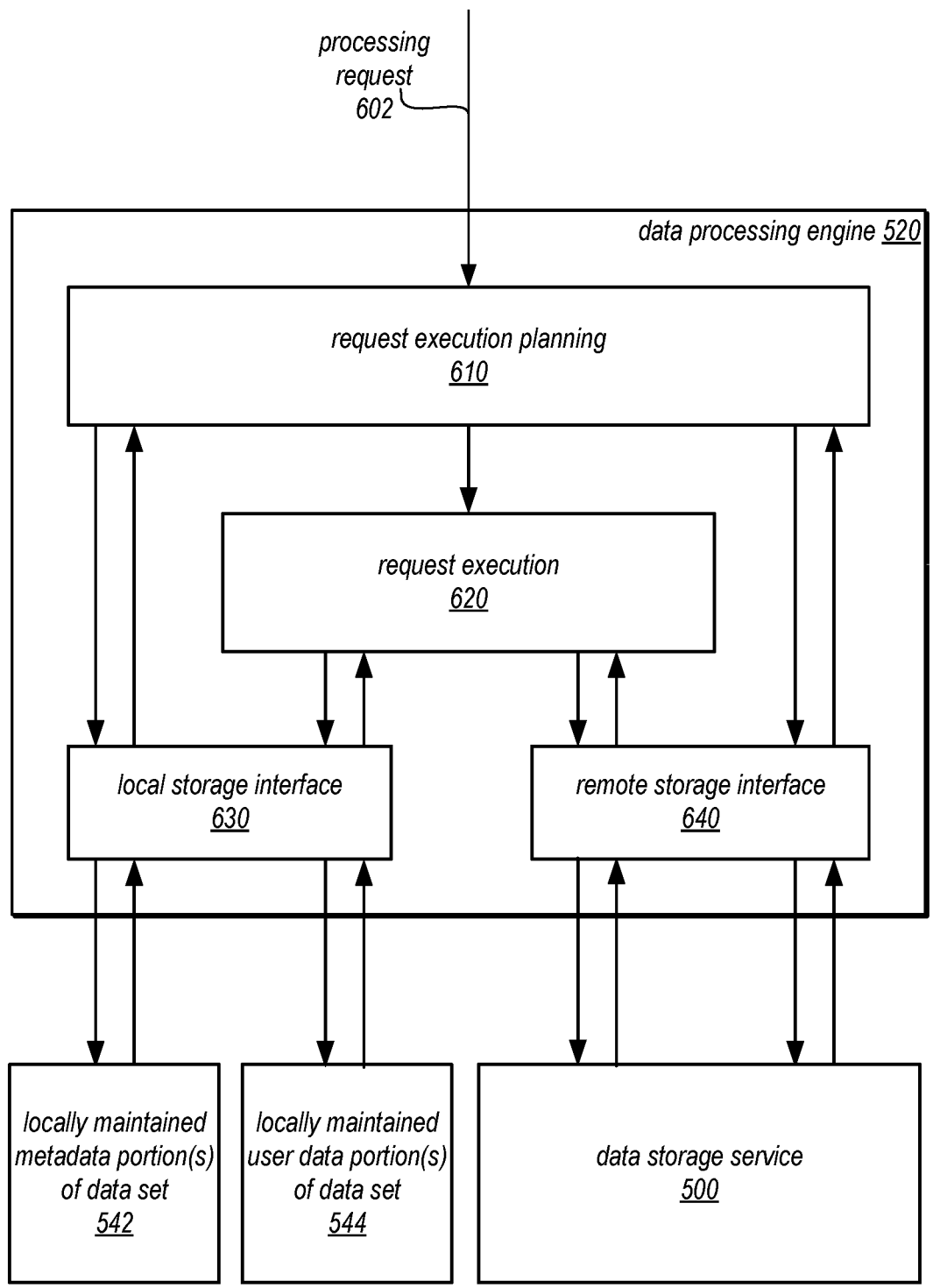
FIG. 6 is a block diagram illustrating an example execution engine that accesses local and remote data storage to execute processing requests, according to some embodiments.

Compute node 510 may implement data processing engine 520 to execute received processing requests 512. FIG. 6 is a block diagram illustrating an example execution engine that accesses local and remote data storage to execute processing requests, according to some embodiments. Data processing engine 520 may be configured to parse, interpret, optimize, and execute processing requests 602 (e.g., queries). Data processing engine 520 may implement request execution planning 610 to perform various operations to optimize execution performance, including determining whether additional data needs to be retrieved from the remote data store. For instance, request execution planning 610 may access locally maintained metadata portions 542 (either in memory or in persistent storage via local storage interface 630) to evaluate zone maps (e.g., indicating a range of values stored in a data portion, such as a data block or chunk), bloom filters (e.g., indicating whether certain query predicates or conditions are not satisfied by values in the data portion), or other probabilistic data structures (e.g., generated by hyperloglog), which may be implemented to prune or identify portions of the data set which do not need to be read in order to satisfy a processing request. Additionally metadata may describe the contents of locally maintained user data, as well as the contents of the data set as a whole. Metadata may be retrieved from data storage service 500 via remote storage interface 640 in order to obtain more descriptive metadata for optimize a processing request execution, in some embodiments (e.g., obtaining additional probabilistic data structures, more fine grained zone maps (data block level, as opposed to a zone map for a group of data blocks). Like the user data, metadata that is frequently accessed may be maintained locally for quick access.

If request execution planning identifies data that needs to be obtained from data storage service 500, then request execution planning may include the identity of the additional data in instructions provided to request execution 620 in order to obtain the data from data storage service 500 via remote storage interface 640. Request execution 620 may also update metadata (e.g., probabilistic data structures) as a result of executing a processing request.

Figure 7:
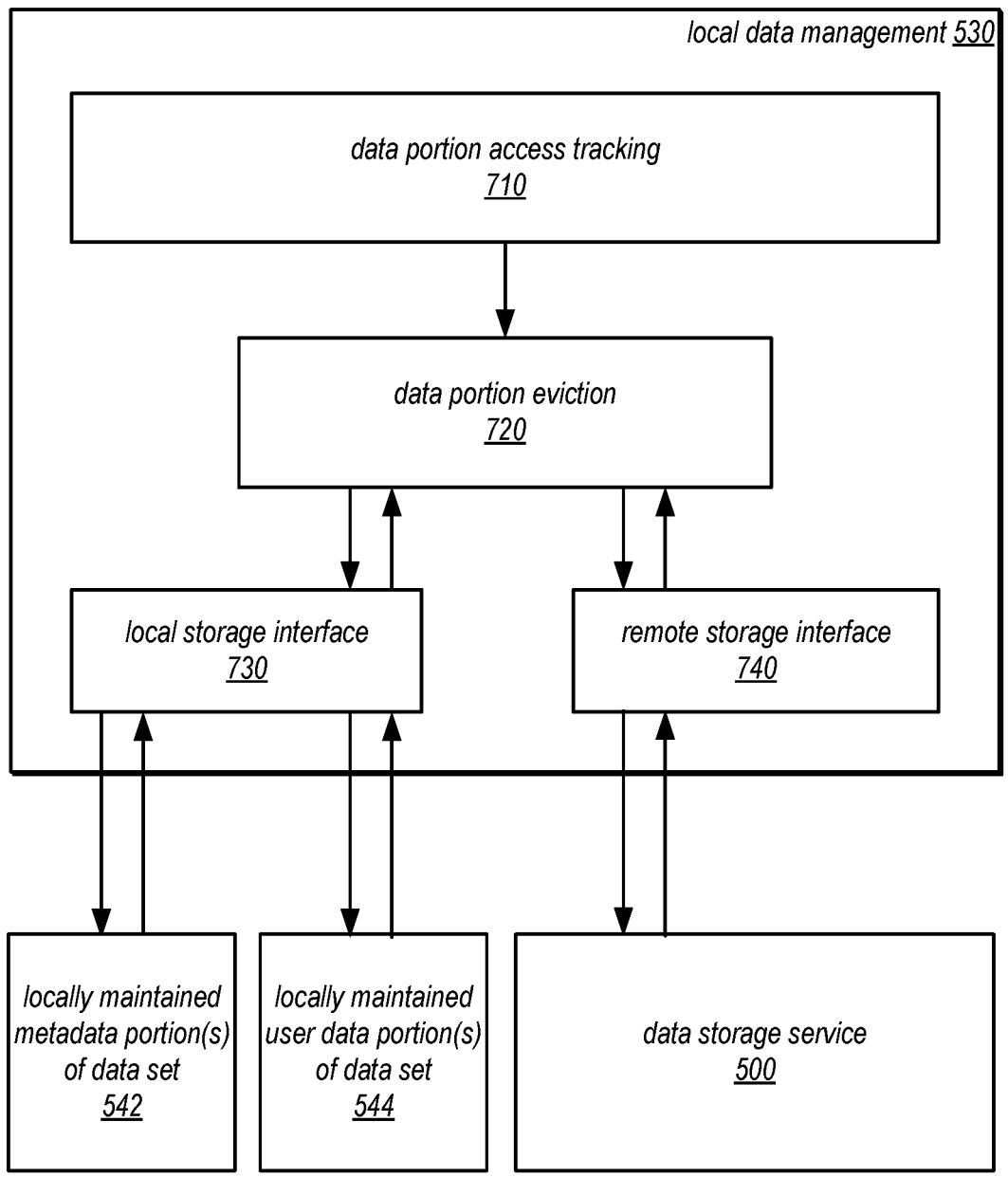
FIG. 7 is a block diagram illustrating local data management that maintains local data storage for executing processing requests, according to some embodiments.

Compute node 510 may implement local data management 530 to manage the contents of local storage maintaining metadata and user data. FIG. 7 is a block diagram illustrating local data management that maintains local data storage for executing processing requests, according to some embodiments. Local data management 530 may implement statistics tracking such as data portion access tracking 710 to determine how frequently data portions are accessed (e.g., how often are individual data blocks read to execute a processing request). Data portion access tracking 720 may, in various embodiments, implement the statistics determinations discussed below with regard to FIG. 9, for example by maintaining account of the number of times a portion of data is accessed, as well as a time since the data portion was last accessed. In this way, techniques that balance frequency and recency can be implemented to select portions of the data set to keep or evict. Other statics or information for making evictions decisions can be determined by data portion access tracking 710 (e.g., by maintaining a queue or representation of when data portions were placed into local storage in order to implement a FIFO eviction scheme). Some data portion eviction techniques may be implemented based on predictive analysis of data portion access statistics. For example, statistical analyses (e.g., linear regression, pattern recognition, frequency analysis, etc.) may be implemented to predict the usage of portions of the data set (either user data or metadata that will or will not be used (e.g., at a future point or period in time). Based on the predicted usage, data portion eviction 720 may select those portions of locally maintained portion(s) of data set 542 or metadata 544 to flush. For instance, portions not likely to be accessed may be identified based on predicted usage and thus may be flushed from local storage.

Local data management 530 may implement data portion eviction 720 to copy or update portions via local storage interface 730 being flushed from locally maintained metadata 542 or user data 544 to be stored at data storage service 500 via remote storage interface 740.

Note that the various arrangements of components illustrated in FIGS. 5-7 are provided as an example of a compute node that may utilized tiered storage. In other embodiments, different combinations of components (e.g., combining portions or all of local data management 530 within portions of data processing engine 520 may be implemented and thus the previous discussions and illustrations is not intended to be limiting as to other implementations of a compute node that utilizes tiered storage.

Figure 8:
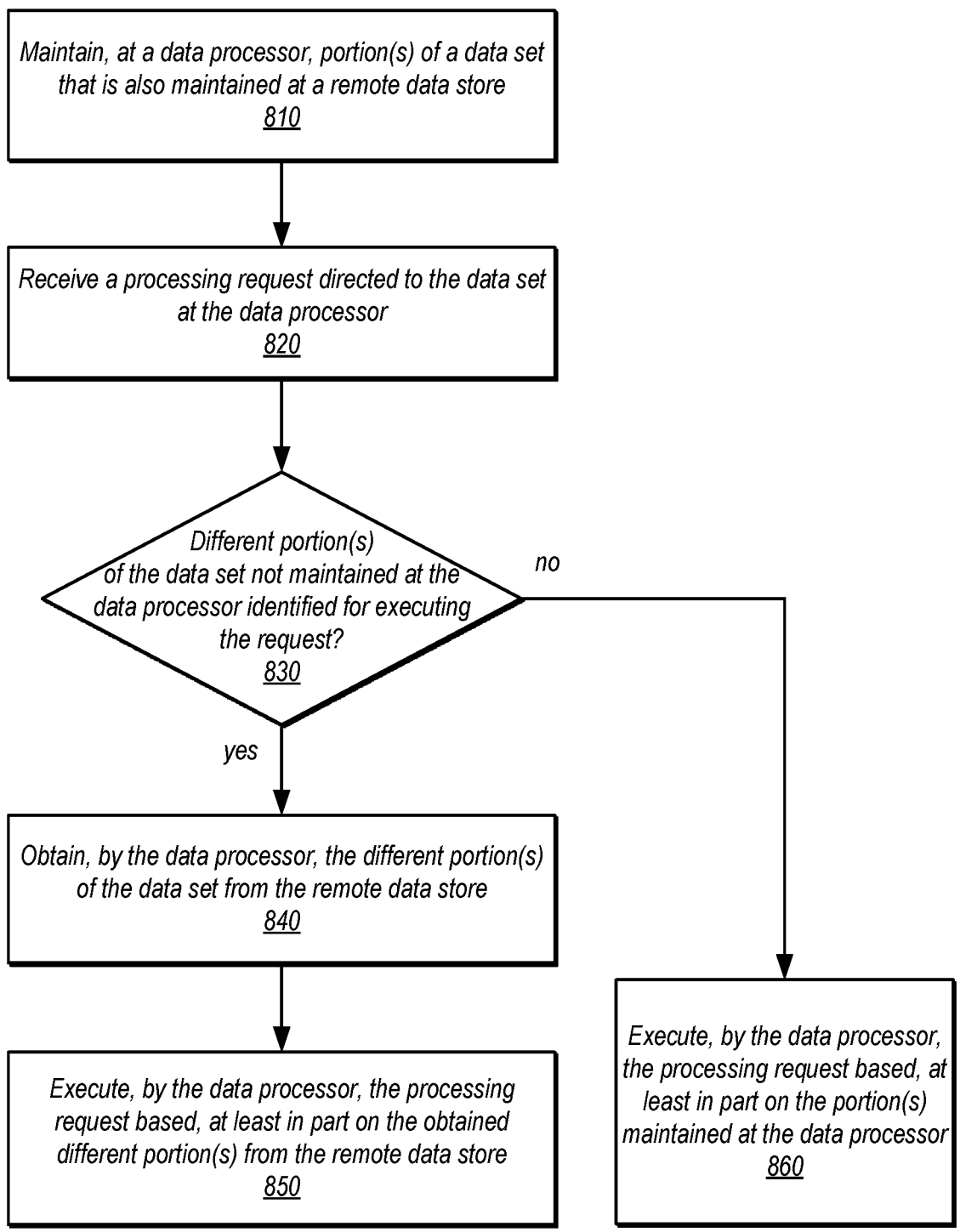
FIG. 8 is a high-level flowchart illustrating methods and techniques to execute processing requests accessing tiered storage, according to some embodiments.

Although FIGS. 2-7 have been described and illustrated in the context of a data storage service, like a data warehousing system implementing a columnar relational database table, the various components illustrated and described in FIGS. 2-7 may be easily applied to other data management systems that provide data processing on behalf of clients. As such, FIGS. 2-6 are not intended to be limiting as to other embodiments of a processing cluster. FIG. 8 is a high-level flowchart illustrating methods and techniques to execute processing requests accessing tiered storage, according to some embodiments.

Various different systems and devices may implement the various methods and techniques described below, either singly or working together. For example, a processing cluster, such as described above with regard to FIGS. 3-7 may be configured to implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, portion(s) of a data set that is also maintained at a remote data store may be maintained at a data processor. For example, previously executed processing requests may be received, portions of the data set to be utilized for data processing the processing requests may be identified, and the identified portions may be obtained, as discussed below. In some embodiments, the access statistics, such as those collected for portions of a data set, discussed below with regard to FIG. 9, may be utilized to pre-load or obtain portions of the data set likely to be accessed. For example, tracking statistics may indicate that a group of data blocks in the data set is most frequently accessed and thus these data blocks may obtained and stored in local storage at the data processor prior to the execution of processing requests. In another example, predicted usage of data (determined according to various statistical analyses of access statistics discussed above) may be used to identify which portions of the data set to obtain and maintain in local storage without or before receiving a processing request that requires the data for execution. In some embodiments, portions of the data set may be initially identified, obtained, and stored according to an assignment scheme (e.g., a hash-based distribution).

As indicated at 820, a processing request direct to the data set may be received at the data processor, in some embodiments. For example, a query formatted according to SQL or a custom processing task, job, or other work assignment formatted according to a programmatic interface may be received via a network-based interface from a client of the data processor (e.g., a database client). The request may specify various conditions or criteria for execution that identify which portions of the data set may be needed to execute the processing request (e.g., query predicates). These conditions or criteria may be evaluated with respect to the locally stored portions of the data (e.g., by accessing local metadata and user data). If different or additional portions are needed to execute the query that are not maintained locally at the data processor, as indicated by the positive exit from 830, then the different portion(s) may be obtained by the data processor from the remote data store, as indicated at 840. For instance, an API request to get one or more data blocks, chunks, objects, or pages may be sent, or an iSCSI request to retrieve, the different portion(s) may be sent to the remote data store which may implement the API or iSCSI interface and return the requested portion(s).

Once the requested portion(s) are obtained, then as indicated at 850, the processing request may be executed by the data processor based, at least in part, on the obtained portion(s) from the remote data store. For instance, if the obtained portions are user data, then the user data may be accessed or evaluated with respect to the conditions or criteria for executing the request. In another example, if the obtained portions are metadata describing user data in the data set, then the metadata may be evaluated to locate data portions of user data to evaluate, prune I/O operations, or perform other optimizations to the execution of the processing request. If different or additional portion(s) are not needed at the data processor to process the processing request, then as indicated by the negative exit from 830, the data processor may execute the processing request based on the data that is already maintained locally at the data processor, as indicated at 860.

Figure 9:
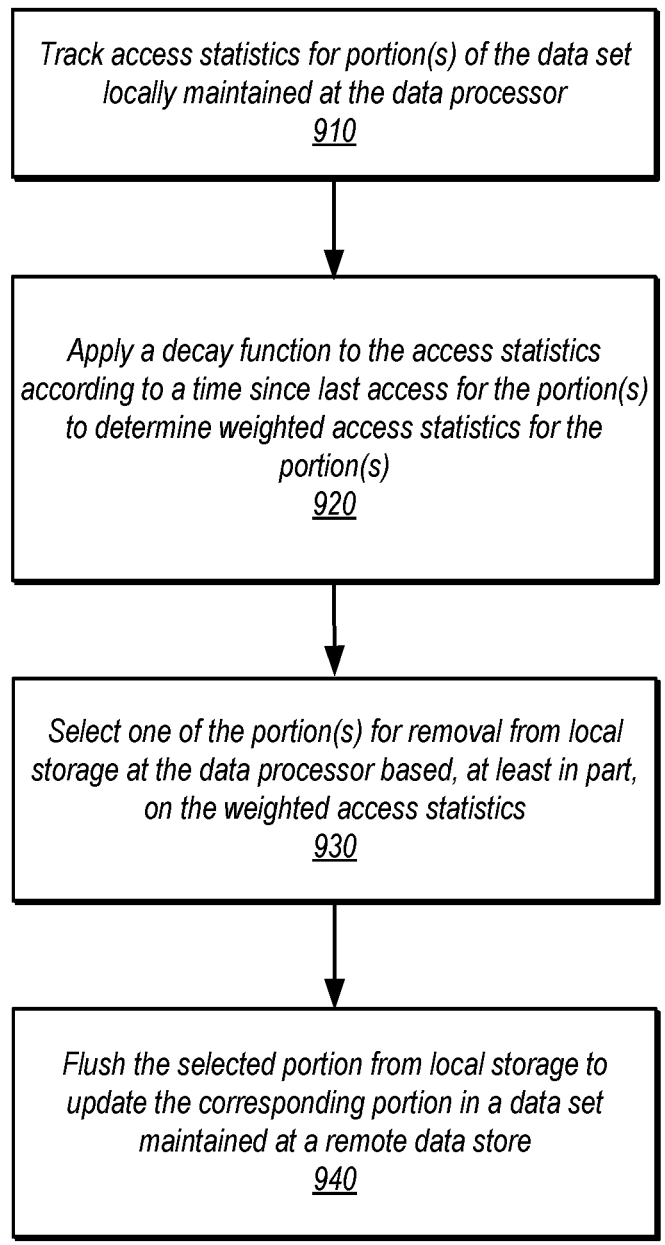
FIG. 9 is a high-level flowchart illustrating methods and techniques to flush portions of a data set locally maintained at a data processor to a remote data store, according to some embodiments.

FIG. 9 is a high-level flowchart illustrating methods and techniques flush portions of a data set locally maintained at a data processor to a remote data store, according to some embodiments. As indicated at 910, access statistics may be tracked for portions of the data set locally maintained at the data processor. In some embodiments, an access count for each portion may be incremented each time the portion is accessed. The time since the last access may also be maintained, in some embodiments. A timestamp may be recorded at the last access. As indicated at 920 a decay function may be applied to the access statistics according to a time since the last access for the portion(s) to determine weighted access statistics for the portion(s), in various embodiments. For example, the decay function may reduce the count for each portion by a factor or number determine based on the amount or length of the time since the last access of the portion. For example, if a data portion was last accessed 1 day ago, then the decay function may reduce the count for the portion by ⅕, whereas if the last access for a portion were 1 week ago, then the count may be reduced by ½. In this way, data that is frequently accessed at one point time does not remain in the local storage if the accesses do not subsequently continue, preventing a rare access scenario (e.g., an infrequent processing request) from dominating the local storage capacity of more recently (but less frequently) accessed portions.

As indicated at 930, one of the portion(s) may be selected for removal from local storage based, at least in part, on the weighted access statistics. For instance, a count threshold may be implemented that removes portions with counts below the threshold. In some embodiments, a ranking selection may be implemented to choose a lowest ranked number of portions according to the weighted access statistics. Once selected, the portion may be flushed from local storage to update the corresponding portion in a data set maintained at the remote data store, as indicated at 940. For example, the selected portion may be used to overwrite the corresponding portion in the remote data store (so that the value(s) of the portion are now stored in the remote data store). Then the selected portion may be reclaimed, marked for deletion or as available to be overwritten with a new portion of data obtained from the remote data store (as discussed above with regard to FIG. 8).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of tiered storage for data processing as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
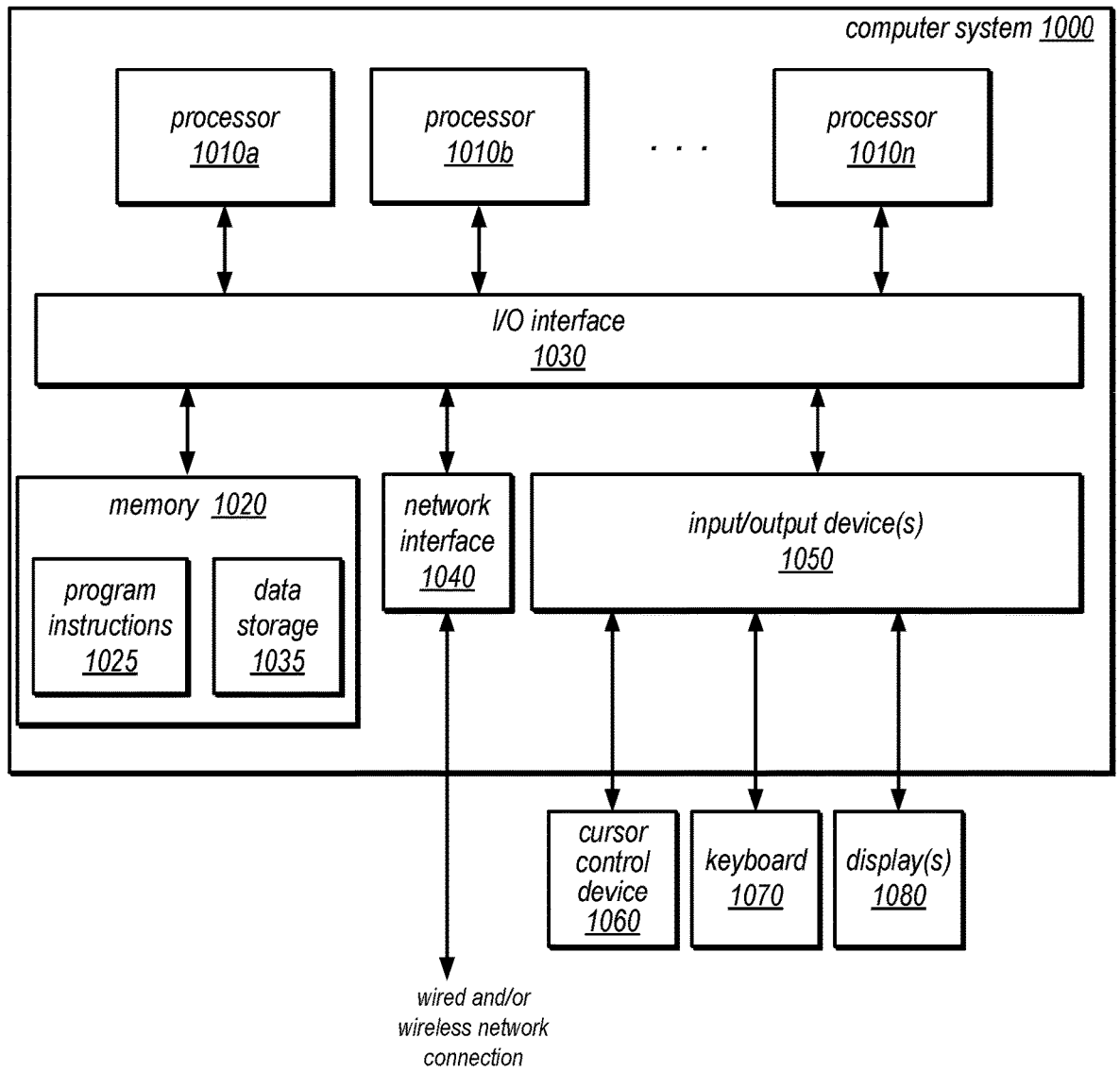
FIG. 10 illustrates an example system configured to implement the various methods, techniques, and systems described herein, according to some embodiments.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more storage devices, configured to maintain data comprising at least some of a data set and metadata describing the data set, wherein the data set including the metadata is fully maintained at a remote data store distinct from the one or more storage devices;
   one or more compute nodes, comprising at least one processor and a memory, configured to implement a processing engine for executing processing requests directed to the data set, wherein the processing engine is connected to the remote data store over a network;
   the processing engine, configured to:
      receive a processing request directed to the data set;
      in response to the receipt of the processing request:
         identify, using the metadata describing the data set from the one or more storage devices, a portion of the data set not present at the one or more storage devices in order to execute the processing request, wherein the portion of the data set not present at the one or more storage devices comprises other metadata describing one or more portions of user data in the data set;
         send a request to the remote data store to obtain the portion of the data set, including the other metadata, from the remote data store;
         responsive to obtaining the portion of the data set including the other metadata, execute the processing request using the one or more portions of user data in the data set based, at least in part, on the other metadata of the portion of the data set obtained from the remote data store.

2. The system of claim 1, wherein the one or more compute nodes are further configured to implement a local data manager, configured to:
   track access statistics for different portions of the at least some data maintained in the storage devices;
   apply a decay function to the access statistics according to respective amounts of time since the different portions were last accessed to determine weighted access statistics for the different portions;
   select one of the different portions for removal from the storage devices based, at least in part, on the weighted access statistics; and
   flush the selected portion from the storage devices to update a corresponding portion in the data set maintained in the remote data store.

3. The system of claim 1, wherein the processing engine is further configured to:
   receive another processing request directed to the data set;
   in response to the receipt of the other request:
      identify the at least some data maintained in the storage devices as sufficient to execute the other request without additional data from the remote data store; and
      execute the other processing request based, at least in part, on the at least some data of the data set.

4. The system of claim 1, wherein the data processor is a processing cluster implemented as part of a data warehouse service in a provider network, wherein the remote data store is implemented as part of a different service in the provider network.

5. A method, comprising:
   performing, by one or more computing devices:
      receiving a processing request directed to a data set at a data processor that executes processing requests directed to the data set, wherein the data set and metadata describing the data set are maintained at a remote data store connected to the data processor over a network, wherein the data processor maintains data comprising one or more portions of the data set on local storage at the data processor for executing processing requests and the metadata describing the data set including a different portion of the data set not maintained at the local storage, and wherein the data processor is distinct from the remote data store;
      in response to receiving the processing request:
         identifying, by the data processor using the metadata, maintained at the data processor, describing the data set, the different portion of the data set not present at the data processor and used for executing the processing request, wherein the different portion of the data set not present at the data processor comprises other metadata describing one or more portions of user data in the data set;
obtaining, by the data processor, the different portion of the data set, including the other metadata, from the remote data store; and
responsive to the obtaining, executing, by the data processor, the processing request using the one or more portions of user data in the data set based, at least in part, on the obtained other metadata of the different portion of the data set.

6. The method of claim 5, wherein executing the processing request comprises optimizing execution of the processing request according to the obtained other metadata.

7. The method of claim 6, wherein the obtained other metadata further describes the one or more portions of the user data in addition to additional metadata maintained at the data processor that also describes the one or more portions of the user data.

8. The method of claim 5, further comprising:
selecting, by the data processor, one of the portions of the data set to remove from the local storage at the data processor; and
flushing, by the data processor, the selected portion from the local storage at the data processor to update a corresponding portion in the data set maintained in the remote data store.

9. The method of claim 8, further comprising:
tracking, by the data processor, access statistics for the portions and the different portion of the data set; and
applying, by the data processor, one or more statistical analyses to the access statistics to determine usage predictions for the portions and the different portion of the data set, wherein the selection of the one portion is based, at least in part, on the usage predictions.

10. The method of claim 5, wherein the processing request is a query comprising one or more predicates, wherein identifying the different portion of the data set not maintained at the data processor for executing the processing request comprises evaluating the metadata describing the data set maintained at the data processor that indicates those portions of the data set that satisfy at least one of the query predicates.

11. The method of claim 5, further comprising:
prior to receiving the processing request:
identifying, by the data processor, the one or more portions of the data set based, at least in part, on access statistics tracked for the one or more portions; and
obtaining, by the data processor, the one or more portions of the data set from the remote data store.

12. The method of claim 5, further comprising:
receiving another processing request directed to the data set at the data processor;
in response to receiving the other request:
identifying, by the data processor, the one or more portions of the data set maintained at the data processor for execution of the other request without additional data from the remote data store; and
executing, by the data processor, the other processing request based, at least in part, on the one or more portions of the data set.

13. The method of claim 5, wherein the data processor is implemented as part of a network-based service of a provider network, and wherein the remote data store is another network-based service of the provider network or a data store external to the provider network.

14. A non-transitory, computer-readable storage medium, storing program instructions that when executed by one or more computing devices cause the one or more computing devices to implement:
maintaining, at one or more storage devices at a data processor, one or more portions of a data set and metadata describing the data set, the data set fully maintained at a remote data store distinct from the one or more storage devices, the metadata describing a different portion of the data set not maintained at the one or more storage devices, and the data processor connected to the remote data store over a network;
receiving, at the data processor, a request directed to the data set;
in response to receiving the processing request:
identifying, by the data processor using the metadata, maintained at the data processor, describing the data set, the different portion of the data set not present at the data processor and used for executing the processing request, wherein the different portion of the data set not present at the data processor comprises other metadata describing one or more portions of user data in the data set;
obtaining, by the data processor, the different portion of the data set, including the other metadata, from the remote data store; and
responsive to the obtaining, executing, by the data processor, the processing request using the one or more portions of user data in the data set based, at least in part, on the obtained other metadata of the different portion of the data set.

15. The non-transitory, computer-readable storage medium of claim 14, wherein the program instructions cause the one or more computing devices to further implement:
receiving another processing request directed to the data set at the data processor;
in response to receiving the other request:
identifying, by the data processor, the one or more portions of the data set maintained at the data processor for execution of the other request without additional data from the remote data store; and
executing, by the data processor, the other processing request based, at least in part, on the one or more portions of the data set.

16. The non-transitory, computer-readable storage medium of claim 14, wherein the processing request is a query comprising one or more query predicates, wherein the identified different portion further comprises user data identified as possibly containing data that satisfies at least one of the query predicates, and wherein executing the processing request comprises evaluating the identified different portion with respect to the query predicates.

17. The non-transitory, computer-readable storage medium of claim 16, wherein the data set is maintained as a table in a column-oriented format, wherein the obtained portion of the data set comprises a portion of column entries in the table.

18. The non-transitory, computer-readable storage medium of claim 14, wherein the program instructions cause the one or more computing devices to further implement:
selecting, by the data processor, one of the portions or the different portion of the data set to remove from local storage at the data processor; and
flushing, by the data processor, the selected portion from the local storage at the data processor to update a corresponding portion in the data set maintained in the remote data store.

19. The non-transitory, computer-readable storage medium of claim 18, wherein the programming instructions cause the one or more computing devices to further implement:
- tracking, by the data processor, access statistics for the portions and the different portion of the data set maintained at the data processor; and
- applying, by the data processor, a decay function to the access statistics according to respective amounts of time since the portions and the different portion of the data set were last accessed to determine weighted access statistics for the portions and the different portion of the data set, wherein the selection of the one portion is based, at least in part, on the weighted access statistics.

20. The non-transitory, computer-readable storage medium of claim 14, wherein the remote data store is implemented as part of a network-based service of a provider network, and wherein the data processor is implemented as part of another network-based service of the provider network or a data processor external to the provider network.

* * * * *